United States Patent
Ahn et al.

(10) Patent No.: US 10,708,799 B2
(45) Date of Patent: Jul. 7, 2020

(54) METHOD AND APPARATUS FOR PERFORMING MEASUREMENT IN UNLICENSED BAND

(71) Applicant: LG ELECTRONICS INC., Seoul (KR)

(72) Inventors: Joonkui Ahn, Seoul (KR); Kijun Kim, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,965

(22) PCT Filed: Aug. 12, 2016

(86) PCT No.: PCT/KR2016/008871
§ 371 (c)(1),
(2) Date: Feb. 12, 2018

(87) PCT Pub. No.: WO2017/026831
PCT Pub. Date: Feb. 16, 2017

(65) Prior Publication Data
US 2018/0234871 A1    Aug. 16, 2018

Related U.S. Application Data

(60) Provisional application No. 62/249,887, filed on Nov. 2, 2015, provisional application No. 62/246,661, filed
(Continued)

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0048* (2013.01); *H04W 28/26* (2013.01);
(Continued)

(58) Field of Classification Search
CPC ..... H04W 24/10; H04W 72/08; H04W 28/26; H04W 74/0816; H04W 74/0808; H04L 5/0048; H04L 5/001
See application file for complete search history.

(56) References Cited

U.S. PATENT DOCUMENTS

2013/0205313 A1   8/2013   Kim et al.
2013/0315157 A1   11/2013  Krishnamurthy et al.
(Continued)

FOREIGN PATENT DOCUMENTS

KR   10-2015-0087840 A   7/2015
WO   2013/069941 A1      5/2013

OTHER PUBLICATIONS

Novlan et al., Methods and apparatus for RRM measurement on unlicensed spectrum, U.S. Appl. No. 62/146,107, filed Apr. 2015 (Year: 2015).*
(Continued)

*Primary Examiner* — Justin T Van Roie
(74) *Attorney, Agent, or Firm* — Birch, Stewart, Kolasch & Birch, LLP (57) ABSTRACT

Provided are a method and an apparatus for performing radio resource management (RRM) measurement in an unlicensed band. The apparatus sets a first measurement section and a second measurement section for the RRM measurement in the unlicensed band, and measures a received signal strength indicator (RSSI) during the first measurement section and the second measurement section.

8 Claims, 6 Drawing Sheets

Related U.S. Application Data on Oct. 27, 2015, provisional application No. 62/236,956, filed on Oct. 4, 2015, provisional application No. 62/222,200, filed on Sep. 22, 2015, provisional application No. 62/207,916, filed on Aug. 21, 2015, provisional application No. 62/204,452, filed on Aug. 13, 2015, provisional application No. 62/204,475, filed on Aug. 13, 2015.

(51) Int. Cl.
    *H04W 28/26*    (2009.01)
    *H04W 74/08*    (2009.01)

(52) U.S. Cl.
    CPC ......... *H04W 74/0816* (2013.01); *H04L 5/001* (2013.01); *H04W 74/0808* (2013.01)

(56) References Cited

U.S. PATENT DOCUMENTS

| | | | |
|---|---|---|---|
| 2015/0092582 A1 | 4/2015 | Liao et al. | |
| 2016/0128084 A1* | 5/2016 | Novlan | H04W 72/1268 370/329 |
| 2016/0302230 A1* | 10/2016 | Novlan | H04B 17/318 |
| 2016/0330678 A1* | 11/2016 | Yoon | H04W 74/006 |
| 2018/0103386 A1* | 4/2018 | Harada | H04W 48/16 |

OTHER PUBLICATIONS

Maattanen et al., Discovery Signal Design and Measurements for Small Cell DTX in Release 12 LTE, 2014, Globecom 2014 Workshop—Telecommunications Standards—From Research to Standards (Year: 2014).*

* cited by examiner

Special subframe, configuration 1, 2, 6 or 7

Special subframe, configuration 3, 4, 8 or 9

All other downlink subframe

FIG. 6

METHOD AND APPARATUS FOR PERFORMING MEASUREMENT IN UNLICENSED BAND

CROSS REFERENCE TO RELATED APPLICATIONS

This application is the National Phase of PCT International Application No. PCT/KR2016/008871, filed on Aug. 12, 2016, which claims priority under 35 U.S.C. 119(e) to U.S. Provisional Application No. 62/204,452, filed on Aug. 13, 2015, No. 62/204,475, filed on Aug. 13, 2015, No. 62/207,916, filed on Aug. 21, 2015, No. 62/222,200, filed on Sep. 22, 2015, No. 62/236,956, filed on Oct. 4, 2015, No. 62/246,661, filed on Oct. 27, 2015 and No. 62/249,887, filed on Nov. 2, 2015, all of which are hereby expressly incorporated by reference into the present application.

BACKGROUND OF THE INVENTION

Field of the Invention

The present invention relates to wireless communication, and more particularly, to a method for performing radio resource management (RRM) measurement in an unlicensed band, and an apparatus using the same.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for performing a radio resource management (RRM) measurement in an unlicensed band and an apparatus using the method.

In an aspect, a method for performing an RRM measurement in an unlicensed band is provided. The method includes setting, by a wireless apparatus, up a first measurement interval and a second measurement interval for the RRM measurement in an unlicensed band, and measuring, by the wireless apparatus, a received signal strength indicator (RSSI) during the first measurement interval and the second measurement interval. The first measurement interval corresponds to a period in which an unlicensed cell operating in the unlicensed band transmits a discovery reference signal (DRS), and the second measurement interval corresponds to a non-transmission period in which the unlicensed cell does not transmit any downlink signal.

In another aspect, an apparatus for performing an RRM measurement in an unlicensed band includes a transceiver configured to transmit and receive a radio signal, and a processor configured to be connected to the transceiver. The processor is configured to set up a first measurement interval and a second measurement interval for the RRM measurement in an unlicensed band, and measure a received signal strength indicator (RSSI) during the first measurement interval and the second measurement interval. The first measurement interval corresponds to a period in which an unlicensed cell operating in the unlicensed band transmits a discovery reference signal (DRS), and the second measurement interval corresponds to a non-transmission period in which the unlicensed cell does not transmit any downlink signal.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
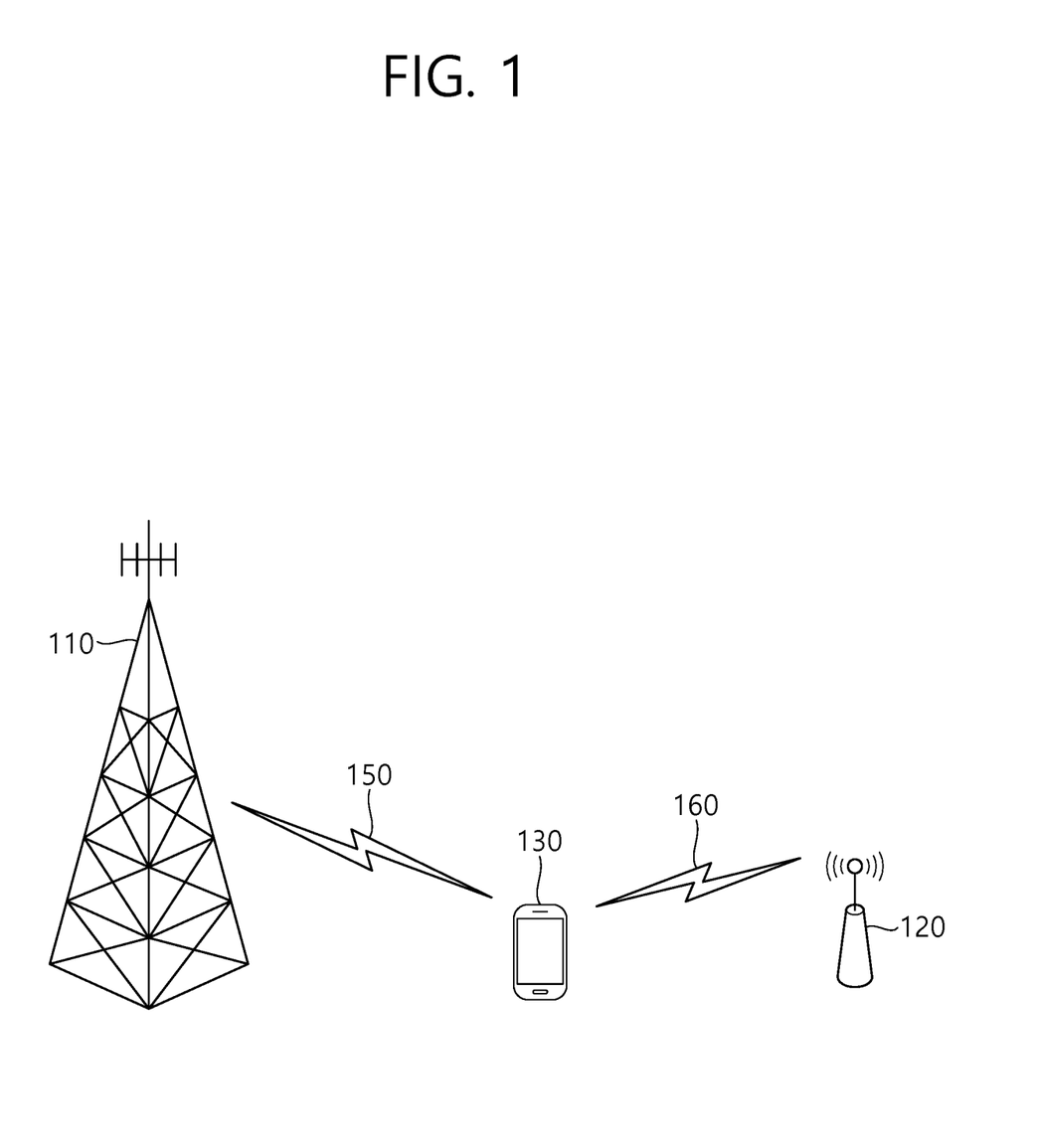
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell operating in an unlicensed band is referred to as 'unlicensed cell' and a cell operating in a licensed band is referred to as 'licensed cell'. For clarity, it is assumed that a licensed cell is a primary cell and an unlicensed cell is a secondary cell.

One representative function required for a licensed-assisted access (LAA) system using LTE is a radio resource management (RRM) measurement. In a conventional 3GPP LTE small-cell environment, a discovery reference signal (DRS) is used for RRM measurement. A BS configures a predetermined discovery measurement timing configuration (DMTC) interval (e.g., 6 ms) for a UE, and the UE periodically attempts to detect a DRS during the set DMTC interval and performs cell identification and RRM measurement.

Even though activated, an unlicensed cell does not always guarantee DL transmission due to the characteristic of an unlicensed band being accompanied by CCA. Since a CCA operation may also be necessary for DRS transmission, DRS transmission for RRM measurement may also not always be guaranteed.

A DRS is a signal periodically transmitted for RRM measurement of a UE. A period in which a UE measures a DRS is referred to as a DMTC. A DMTC may include one or more consecutive subframes. A subframe may include a plurality of orthogonal frequency division multiplexing (OFDM) symbols. During a DMTC, a DRS may include a cell-specific reference signal (CRS) and/or a channel state information-reference signal (CSI-RS).

Hereinafter, proposed is a method for performing RRM measurement and reporting a measurement result when DRS transmission is not guaranteed due to the performance of CCA.

Figure 2:
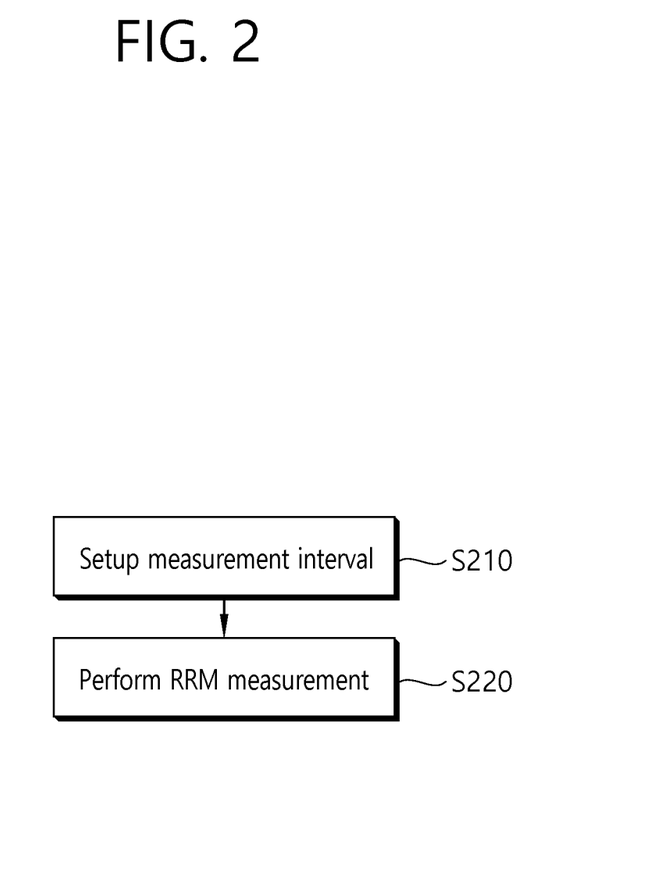
FIG. 2 shows a measurement process according to an embodiment of the present invention.

FIG. 2 shows a measurement process according to an embodiment of the present invention.

In step S210, a UE sets up a measurement interval for RRM measurement. In step S220, the UE performs RRM measurement during the measurement interval.

Indicators of RRM measurement may include a reference signal received power (RSRP), a received signal strength indicator (RSSI), and a reference signal received quality (RSRQ).

RSRP Measurement

RSRP refers to the power of a reference signal received by a UE. RSRP may be measured as the power distribution of a resource element (RE) including a CRS within a measurement bandwidth. RSRP applies to both a radio resource control (RRC) idle mode and an RRC connected mode.

RSRP measurement in an unlicensed band is intended to provide information on the unlicensed band to a network and to estimate UL path loss for UL power control.

When a secondary cell is configured as a serving cell in an unlicensed band, a UE may measure RSRP based on a CRS (along with a CSI-RS if configured) included in a DRS received from the serving cell. When the presence of a DRS is detected regardless of whether the DRS is configured, the UE may perform RSRP measurement based on the DRS.

RSRP measurement on a non-serving cell in an unlicensed cell is as follows.

Since RSRP measurement on a non-serving cell is intended to assist in configuring/releasing a secondary cell, a UE may measure RSRP based on a CRS (along with a CSI-RS if configured) included in a DRS received from the non-serving cell.

When the non-serving cell belongs to a network operator other than a network operator to which the UE is connected, transmission time synchronization may not be achieved between the non-serving cell and a serving cell. Accordingly, when RSRP measurement is limited to a DMTC interval, the UE may not properly receive a DRS from the non-serving cell. In order to detect a DRS from the non-serving cell, the UE may also detect a DRS in an interval other than the DMTC interval set by the serving cell.

The UE may perform a DRS detection operation even in an interval other than the DMTC interval with respect to a frequency carrier in which the DMTC is set. Compared to a DRS that can be detected only in a DMTC interval, a DRS that can be detected in a DMTC interval and the other interval is referred to as an unrestricted DRS. Requirements of the time period of an unrestricted DRS and the number of unrestricted DRSs may be specified separately from a requirement for DRS detection, in which a longer period and a smaller number may be required for an unrestricted DRS than for a DRS in order to reduce the load of the UE detecting an unrestricted DRS.

A DRS sequence for an unrestricted DRS may be defined independently. The UE may detect an unrestricted DRS in a time interval in which the serving cell is deactivated. The UE may detect an unrestricted DRS on a frequency carrier other than a frequency carrier on which the serving cell operates. When a command to activate the serving cell is received while an unrestricted DRS is detected in the interval in which the serving cell is deactivated, the UE may receive the command to activate the serving cell and may extend time by applying an additional time to the maximum time required for the cell to perform a normal reception operation, which is for the serving cell to be activated and to return to the normal reception operation.

Since carriers allocated in an unlicensed band are generally very contiguous, RSRP measurement on an unlicensed cell may be shared among collocated UEs. When RSRP measurement is shared, all cells in the unlicensed cell do not need to transmit a DRS, thus reducing DRS loads. The UE may measure RSRP by combining the power of DRSs received from a plurality of unlicensed cells, and the BS may report information on the plurality of unlicensed cells that the UE can combine. When DRS transmission power is different for the unlicensed cells, the UE may not properly combine DRS reception power. To solve this problem, the BS report, to the UE, the DRS transmission power of each unlicensed cell and/or the DRS transmission power offset of each unlicensed cell relative to reference power. A particular unlicensed cell or a licensed cell may be set as a reference cell for DRS transmission power.

RSSI Measurement

RSSI refers to the total level of all power received by a UE. Generally, RSSI is measured to obtain RSRQ. RSSI measurement in an unlicensed band is intended to provide a network with information about hidden node interference and total interference.

To measure hidden node interference, RSSI may be measured during the transmission period of a serving cell. The transmission period of the serving cell may include a DRS transmission period. When DRS reception energy is greater than a specified value, the UE may determine that the serving cell is transmitting a DRS and may measure RSSI. In addition, the transmission period of the serving cell may include an additional transmission period. The additional transmission period may include one or more subframes in which a DL signal is detected or DL transmission is scheduled.

To measure total interference, RSSI may be measured without restriction on a measurement period. RSSI may be measured in the non-transmission period of the serving cell in order to estimate potential interference. Information about the non-transmission period (or RSSI measurement period) of the serving cell may reported by the serving cell to the UE. The UE may measure RSSI during a DRS transmission period or a DRS non-transmission period assuming that when an unlicensed cell is deactivated, the unlicensed cell does not transmit a DL signal except for a DRS.

As described above, RSSI may be used to measure hidden node interference that occurs while the serving cell performs transmission or to measure total interference that occurs while the serving cell does not perform transmission. Thus, a time interval in which the UE needs to measure RSSI may be specified depending on the desired purpose of the serving cell.

To specify a time interval for RSSI measurement for the UE, the serving cell may give a command to perform an RSSI measurement/report operation via a higher-layer message (MAC message and/or RRC message) and may specify a measurement time interval for the corresponding RSSI report.

For example, the serving cell transmits a measurement interval in which the UE measures RSSI through an MAC message. The UE reports, to the network, information about RSSI measured during the time interval. The measurement interval may be assigned to be a specified interval from or after the time the MAC message is transmitted. The UE may report the measured RSSI to the network via an MAC message. The UE may stop reception from another cell (particularly, an unlicensed cell) while measuring RSSI.

A plurality of RSSI measurement interval sets may be defined. The serving cell may assign, for the UE, an RSSI measurement interval for the UE to measure RSSI. The RSSI interval may be defined by a time length, a time period, and/or a time offset expressed in subframes. A plurality of RSSI measurement intervals may be set for one UE. An RSSI measurement interval for measuring hidden node interference and an RSSI measurement interval for measuring total interference may be independently set, and RSSI measured in each RSSI measurement interval may be independently reported.

Suppose that an RSSI measurement interval includes one or more subframes, which are defined as a measurement subframe. In order that a BS accurately understands the time interval in which the UE measures RSSI, a subframe (or a subframe set) in which the UE actually measures RSSI may be limited to a subframe (or a subframe set) closest to time T (T≥0) before the time the UE reports RSSI information among predetermined candidate subframes. Alternatively, a subframe (or a subframe set) in which the UE actually measures RSSI may be limited to a subframe (or a subframe set) closest to time T after the time the BS triggers RSSI measurement among the predetermined candidate subframes.

The UE may report an RSSI measurement result along with information on a time interval in which RSSI is measured (or a subframe in which RSSI is measured or an OFDM symbol in which RSSI is measured).

When the UE reports the time interval in which RSSI is measured, the UE may arbitrarily designate an RSSI measurement interval. The UE may arbitrarily select a subframe or an OFDM symbol in which RSSI is to be measured.

All subframes may be designated as candidate subframes for RSSI measurement. Any time interval before the time the UE reports an RSSI value may be selected as an RSSI measurement interval. The RSSI measurement interval may be selected after the time the UE reports the last RSSI. The RSSI measurement interval may be selected after the time the BS sets the UE to report RSSI. The RSSI measurement interval may be limited to a time point within a specified time before the UE reports RSSI.

The UE may report an average of RSSI values in N (N>1) RSSI measurement intervals obtained via filtering. The N RSSI measurement intervals may be arbitrarily selected time intervals before the UE reports the average value. The N RSSI measurement intervals may be selected after the time the UE reports the last RSSI. The N RSSI measurement intervals may be selected after the time the BS sets the UE to report RSSI. The N RSSI measurement intervals may be limited to a time point within a specified time before the UE reports RSSI. The N measurement intervals may be limited to include different OFDM symbols or to include different subframes.

A DMTC interval in which the serving cell always attempts DRS transmission or an interval in which a DRS is detected may be excluded from an RSSI measurement interval. When the UE performs inter-frequency measurement in an RSSI measurement interval, the UE may stop reception on a serving-cell carrier in the unlicensed band in order to measure another frequency carrier. The DMTC interval may be excluded from an RSSI measurement interval so as not to disturb DRS reception on the serving-cell carrier.

When a measurement gap for inter-frequency measurement is set for the UE, an RSSI measurement interval may be valid only within the measurement gap. When the RSSI measurement interval is set by the BS, the BS may set the RSSI measurement interval only within the measurement gap. The UE can measure RSSI only in the RSSI measurement interval overlapping the measurement gap.

Figure 3:
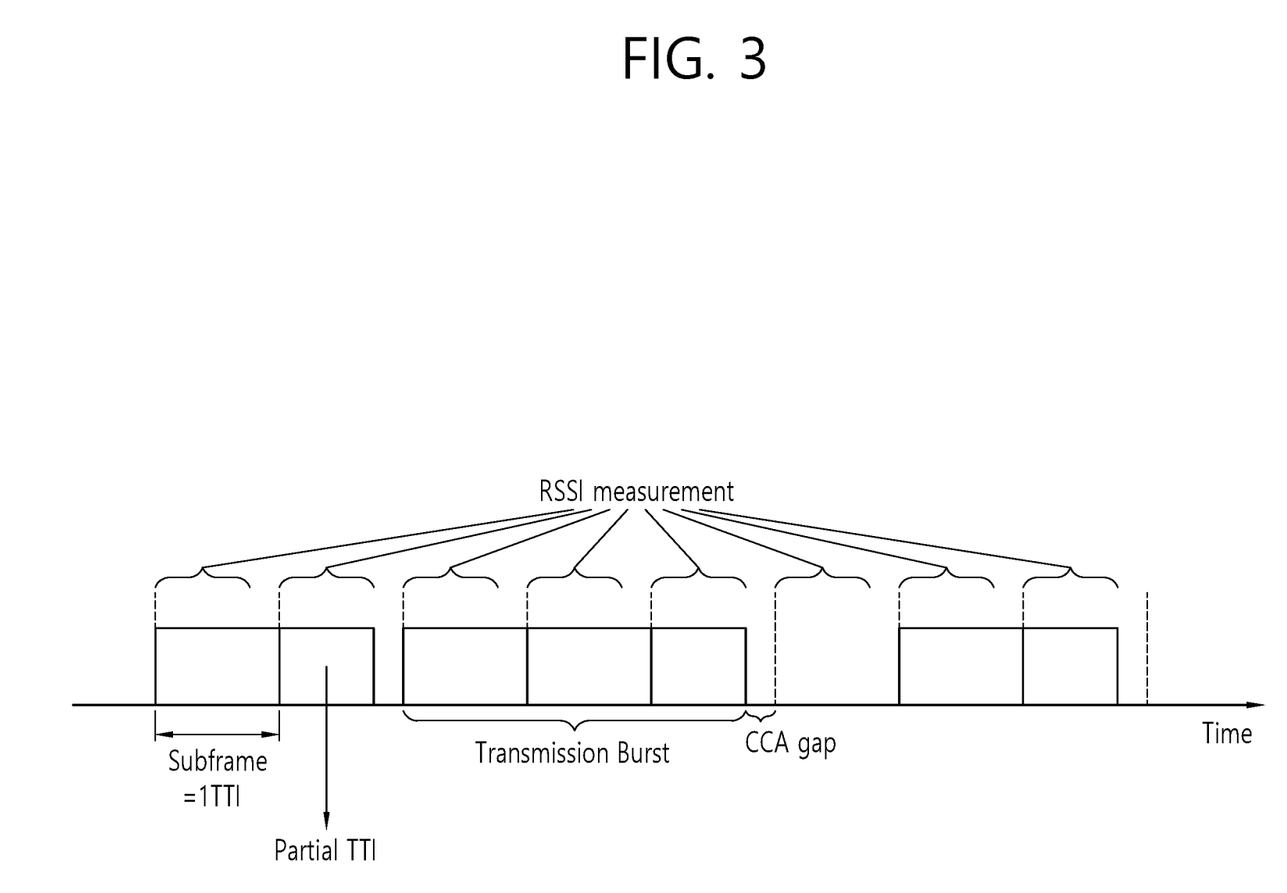
FIG. 3 shows an example of RSSI measurement.

FIG. 3 shows an example of RSSI measurement.

The time taken to transmit one subframe is defined as a transmission time interval (TTI). Some OFDM symbols in a subframe are not used for DL transmission and are defined as a partial TTI. A transmission burst refers to the transmission of data in one or more consecutive TTIs (and/or partial TTIs).

To measure hidden node interference, a UE does not measure RSSI in an OFDM symbol that is unlikely to be used for actual DL signal transmission due to a CCA gap in which CCA is performed or partial TTI transmission. For example, when the last OFDM symbol of a particular subframe is a CCA gap, the UE does not measure RSSI in the last OFDM symbol.

The UE may measure RSSI in all subframes within an RSSI measurement interval except for such an OFDM symbol. Alternatively, the UE may measure RSSI only in an interval in which a DL signal from a serving cell is detected or the DL signal is expected to be detected within an RSSI measurement interval.

On the contrary, to measure total interference in an interval in which the serving cell does not transmit a DL signal, the UE may measure RSSI only in an OFDM symbol that is unlikely to be used for actual DL signal transmission due to a CCA gap in which CCA is performed or partial TTI transmission. When the last M OFDM symbols of a subframe are not used for DL transmission for CCA, the UE may measure RSSI in the M OFDM symbols. Considering a mismatch in subframe transmission/reception time between a BS and a plurality of UEs, the UE may measure RSSI in (M−1) OFDM symbols excluding the last OFDM symbol. Alternatively, when the first K OFDM symbols of a subframe are not used for DL transmission for CCA, the UE may measure RSSI in the K OFDM symbols. Considering a mismatch in subframe transmission/reception time between a BS and a plurality of UEs, the UE may measure RSSI in (K−1) OFDM symbols excluding the first OFDM symbol.

The BS may set RRC signaling for the UE to determine which to use for RSSI measurement between a limited OFDM symbol interval and the other OFDM symbol interval (e.g., the entire OFDM symbol interval). When the UE is not configured to use a specified OFDM symbol interval or the entire OFDM symbol interval, the UE may measure RSSI in the limited OFDM symbol interval.

RSRQ Measurement

RSRQ is the ratio of reference signal power to power received by a UE, which is defined by RSRQ=N*RSRP/RSSI, where N is the number of resource blocks (RBs) over an RSSI measurement bandwidth.

In order that an RSRQ value in an unlicensed band approaches an RSRQ value in the case where other nodes do not perform transmission through a CCA operation while a serving cell actually performs DL transmission, RSSI, which is the denominator of the RSRQ value, or an interference value may be measured only in a time interval in which transmission by the serving cell is detected or in a time interval in which the serving cell is expected to perform transmission. A BS may report to a UE whether to use RSSI only in the transmission interval of the serving cell or to use RSSI without limitation.

Hereinafter, the structure of a DL reference signal (RS) in an unlicensed band is proposed.

In performing DL transmission in an unlicensed band after CCA, to enable DL transmission by the same BS or different BSs over a plurality of consecutive subframes, a CCA gap in which no signal is transmitted may be required for a CCA operation between subframes.

One or more OFDM symbols in one subframe may be defined as a CCA gap. For example, in the 3GPP, one subframe includes 14 OFDM symbols in a normal cyclic prefix (CP) and includes 12 OFDM symbols in an extended CP. The first OFDM symbol or the last OFDM symbol may be defined as a CCA gap. A subframe having a CCA gap is referred to as a partial subframe, and a subframe having no CCA gap is referred to as a full subframe.

In a partial subframe, the position of an OFDM symbol on which an RS is conventionally transmitted may be different from that in a full subframe.

Figure 4:
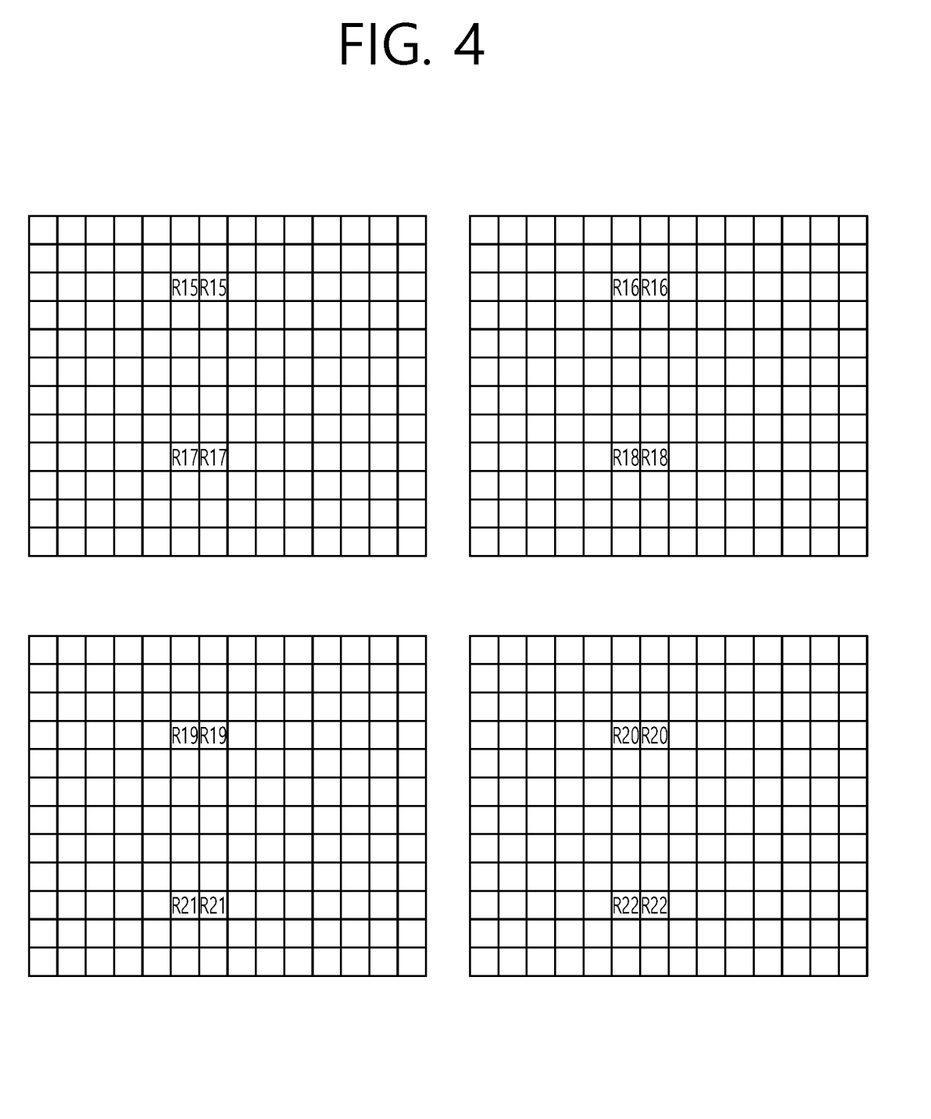
FIG. 4 shows an example of a CSI-RS arrangement in 3GPP LTE.

FIG. 4 shows an example of a CSI-RS arrangement in 3GPP LTE. Rn represents a CSI-RS for antenna port n.

A CSI-RS is transmitted via the sixth and seventh OFDM symbols, while a CSI-RS may be transmitted via the tenth and eleventh OFDM symbols in a partial subframe.

Figure 5:
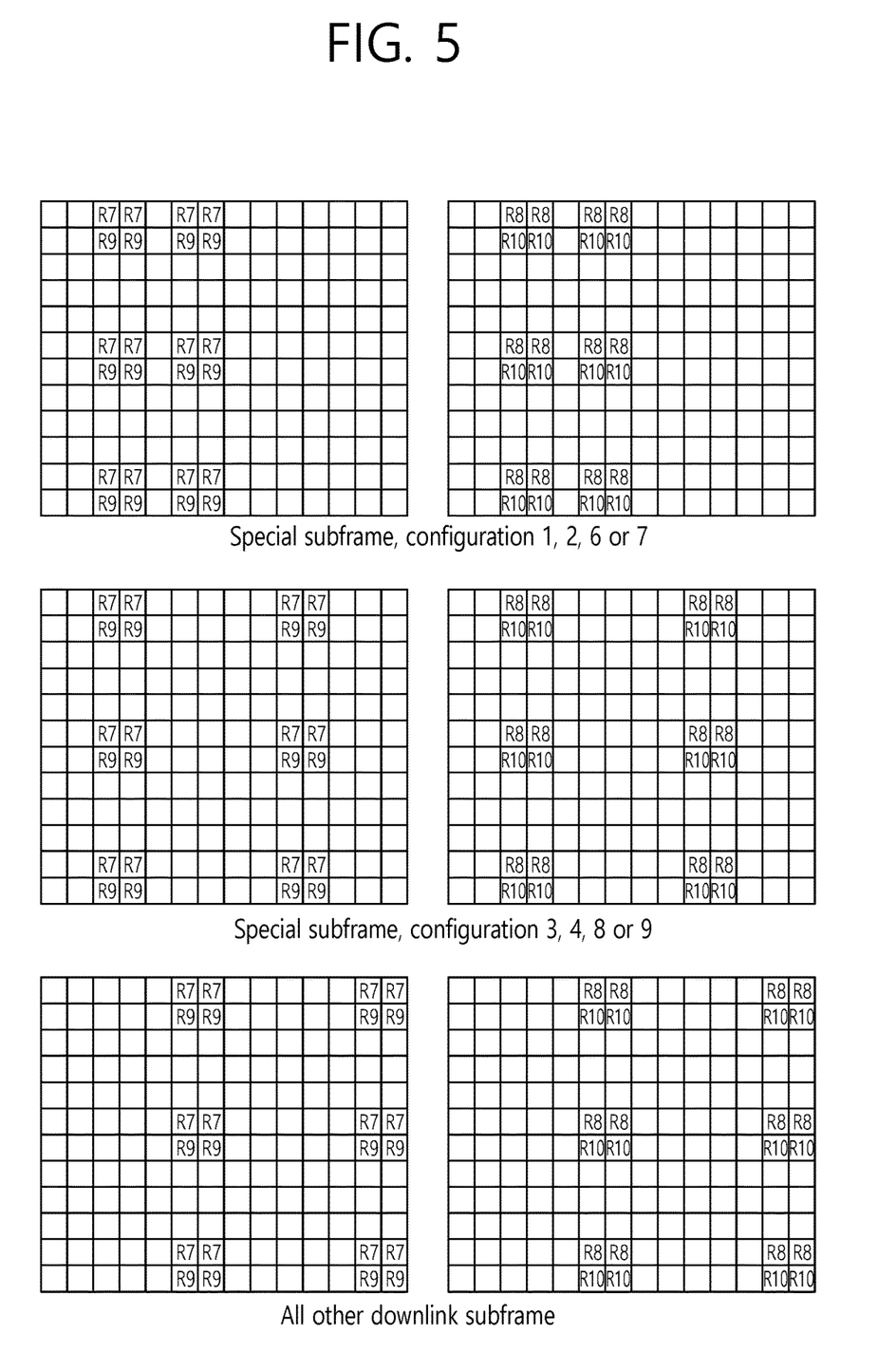
FIG. 5 shows an example of a URS arrangement in 3GPP LTE.

FIG. 5 shows an example of a UE-specific RS (URS) arrangement in 3GPP LTE. R7 is a URS for antenna port 7, R8 is a URS for antenna port 8, R9 is a URS for antenna port 9, and R10 is a URS for antenna port 10.

A URS structure defined for all other downlink subframes may be applied to a full subframe, and a URS structure defined for a special subframe configuration may be applied to a partial subframe.

However, a CSI-RS and a URS transmitted in a partial subframe may collide on the same subcarrier of the same OFDM symbol. In order to avoid such a collision, the following methods are proposed.

In a first embodiment, no CSI-RS is transmitted in a partial subframe. Transmitting no CSI-RS may be applied to all partial subframes or only to an RE or an OFDM symbol where a collision between a CSI-RS and a URS occurs.

When a subframe configured for CSI-RS transmission is a partial subframe, a UE does not expect to transmit all or some CSI-RSs and does not perform measurement using a CSI-RS. When a CSI-RS and a URS collide in a partial subframe (the same OFDM symbol or the same RE), the UE may assume that any CSI-RS is not transmitted in the corresponding subframe or a CSI-RS is not transmitted via an antenna port corresponding to the URS.

In a second embodiment, when a UE detects an enhanced physical downlink control channel (EPDCCH) to be demodulated using a URS from a partial subframe or receives a PDSCH to be demodulated using a URS that is scheduled in the partial subframe, the UE may assume that no CSI-RS is transmitted in the partial subframe. This embodiment may be applied to all partial subframes or only to an RE or an OFDM symbol where a collision between a CSI-RS and a URS occurs.

When a CSI-RS and a URS collide in a partial subframe (the same OFDM symbol or the same RE) scheduled for the EDPCCH/PDSCH, the UE may assume that any CSI-RS is not transmitted in the corresponding subframe or a CSI-RS is not transmitted via an antenna port corresponding to the URS.

In a third embodiment, when a subframe configured for CSI-RS transmission is a partial subframe, and a URS and a CSI-RS collide in the same OFDM symbol or the same RE, a UE may assume that a BS does not transmit an EPDCCH to be demodulated using a URS or does not schedule a PDSCH to be demodulated using a URS in this partial subframe.

In a fourth embodiment, a BS may report whether a CSI-RS is transmitted in a particular subframe using downlink control information (DCI) on a PDCCH. The DCI may be used to schedule a PDSCH. Using the DCI, a UE may know whether the UE can perform measurement using a CSI-RS in the particular subframe. The UE may determine whether a PDSCH RE is transmitted in a position for a CSI-RS and may apply rate matching for PDSCH reception.

In a fifth embodiment, a BS may report, via DCI triggering an aperiodic CSI report, whether a subframe in which the aperiodic CSI report is triggered is a partial subframe, the length of the partial subframe and/or information about a CSI-RS port/configuration. The UE may know whether a CSI-RS for CSI measurement is received in the subframe.

In a sixth embodiment, when the last OFDM symbol of a subframe is a CCA gap, a PDSCH and a DL RS transmitted in a partial subframe may be configured in a structure such that the first OFDM symbol generated for a full subframe is not transmitted in order to avoid a collision with a CSI-RS due to a URS position change. That is, for example, when a full subframe includes 14 OFDM symbols having indexes 0 to 13, wherein the last 3 OFDM symbols are a CCA gap, signals actually transmitted on OFDM symbols 0 to 10 may be signals to be transmitted through OFDM symbols 3 to 13 excluding signals to be transmitted through OFDM 0 to 2.

Figure 6:
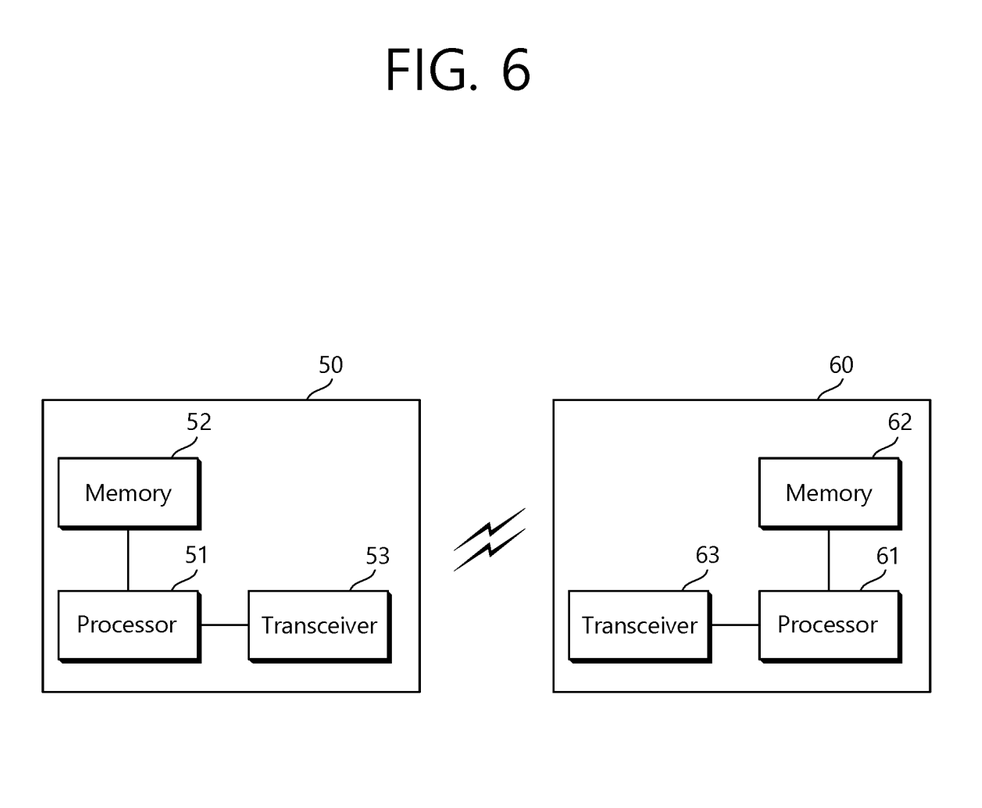
FIG. 6 is a block diagram illustrating a wireless communication system that implements an embodiment of the present invention.

FIG. 6 is a block diagram illustrating a wireless communication system that implements the embodiments of the present invention.

A wireless apparatus 50 includes a processor 51, a memory 52 and a transceiver 53. The memory 52 is connected to the processor 51 and stores various instructions executed by the processor 51. The transceiver 53 is connected to the processor 51 and transmits and/or receives radio signals. The processor 51 implements proposed functions, processes, and/or methods. In the above embodiments, the operation of the wireless apparatus 50 may be implemented by the processor 51. When the above embodiments are configured as a software instruction, the instruction may be stored in the memory 52 and may be executed by the processor 51 to perform the operation.

A BS 60 includes a processor 61, a memory 62 and a transceiver 63. The BS may operate in an unlicensed band. The memory 62 is connected to the processor 61 and stores various instructions executed by the processor 61. The transceiver 63 is connected to the processor 61 and transmits and/or receives radio signals. The processor 61 implements proposed functions, processes, and/or methods. In the above embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a radio resource management (RRM) measurement in an unlicensed band, the method comprising:
    setting, by a wireless apparatus, a first measurement interval and a second measurement interval for the RRM measurement in the unlicensed band; and
    measuring, by the wireless apparatus, a received signal strength indicator (RSSI) during the first measurement interval and the second measurement interval,
    wherein the first measurement interval corresponds to a discovery reference signal (DRS) transmission period in which an unlicensed cell operating in the unlicensed band transmits the DRS,
    wherein the second measurement interval corresponds to a non-DRS transmission period in which the unlicensed cell does not transmit any downlink signal,
    wherein, when a DRS reception energy is greater than a threshold value, the RSSI is measured only during the first measurement interval corresponding to the DRS transmission period,
    wherein the DRS reception energy is not the same as a reference signal received power (RSRP) of the DRS,
    wherein, when the unlicensed cell is deactivated by a medium access control (MAC) signaling, the wireless apparatus assumes that the unlicensed cell does not transmit the downlink signal except for the DRS during the first measurement interval corresponding to the DRS transmission period,
    wherein the wireless apparatus detects the DRS in a discovery measurement timing configuration (DMTC) interval set by a serving cell and also detects the DRS in a time interval other than the DMTC interval, and
    wherein the time interval other than the DMTC interval corresponds to when the serving cell is deactivated.

2. The method of claim 1, wherein information on the first measurement interval and the second measurement interval is received from a base station operating the unlicensed cell.

3. The method of claim 1, wherein the unlicensed cell is a secondary cell.

4. The method of claim 1, wherein the RSSI is not measured in an interval corresponding to a clear channel assessment (CCA) gap for checking CCA within the first measurement interval.

5. The method of claim 1, wherein the second measurement interval comprises an interval corresponding to a clear channel assessment (CCA) gap.

6. An apparatus for performing a radio resource management (RRM) measurement in an unlicensed band, the apparatus comprising:
    a transceiver configured to transmit and receive a radio signal; and
    a processor configured to be connected to the transceiver, and configured to:
    set a first measurement interval and a second measurement interval for the RRM measurement in the unlicensed band; and
    measure a received signal strength indicator (RSSI) during the first measurement interval and the second measurement interval,
    wherein the first measurement interval corresponds to a discovery reference signal (DRS) transmission period in which an unlicensed cell operating in the unlicensed band transmits the DRS,
    wherein the second measurement interval corresponds to a non-DRS transmission period in which the unlicensed cell does not transmit any downlink signal,
    wherein, when a DRS reception energy is greater than a threshold value, the RSSI is measured only during the first measurement interval corresponding to the DRS transmission period,
    wherein the DRS reception energy is not same as a reference signal received power (RSRP) of the DRS,
    wherein, when the unlicensed cell is deactivated by a medium access control (MAC) signaling, it is assumed that the unlicensed cell does not transmit the downlink signal except for the DRS during the first measurement interval corresponding to the DRS transmission period,
    wherein the processor detects the DRS in a discovery measurement timing configuration (DMTC) interval set by a serving cell and also detects the DRS in a time interval other than the DMTC interval, and
    wherein the time interval other than the DMTC interval corresponds to when the serving cell is deactivated.

7. The apparatus of claim 6, wherein information on the first measurement interval and the second measurement interval is received from a base station operating the unlicensed cell.

8. The apparatus of claim 6, wherein the unlicensed cell is a secondary cell.

* * * * *